United States Patent
Yamanaka et al.

(10) Patent No.: US 7,172,059 B2
(45) Date of Patent: Feb. 6, 2007

(54) ELECTROMAGNETIC COUPLING

(75) Inventors: Shigeaki Yamanaka, Hiroshima (JP); Masahiro Dohi, Hiroshima (JP)

(73) Assignee: Kubota Iron Works Co., Ltd., Hiroshima (JP)

( * ) Notice: Subject to any disclaimer, the term of this patent is extended or adjusted under 35 U.S.C. 154(b) by 0 days.

(21) Appl. No.: 10/822,207

(22) Filed: Apr. 8, 2004

(65) Prior Publication Data

US 2005/0061597 A1    Mar. 24, 2005

(30) Foreign Application Priority Data

Sep. 19, 2003    (JP)    ............... 2003-327538

(51) Int. Cl.
*F16D 47/00*    (2006.01)
*F16D 27/00*    (2006.01)

(52) U.S. Cl. ........................ 192/35; 192/84.7

(58) Field of Classification Search ............ 192/35, 192/84.7, 107 M
See application file for complete search history.

(56) References Cited

U.S. PATENT DOCUMENTS

| | | | | |
|---|---|---|---|---|
| 2,933,171 | A | * | 4/1960 | Kraeplin ................. 192/35 |
| 4,189,042 | A | | 2/1980 | Miller |
| 5,123,157 | A | | 6/1992 | Cerny |
| 6,158,561 | A | * | 12/2000 | Sakai et al. ............... 192/35 |
| 6,578,684 | B2 | * | 6/2003 | Yamamoto et al. ........... 192/35 |
| 6,585,093 | B2 | * | 7/2003 | Hara et al. ................. 192/35 |
| 6,622,838 | B2 | * | 9/2003 | Suzuki ..................... 192/35 |
| 6,729,455 | B2 | * | 5/2004 | Hirota et al. ............... 192/35 |
| 6,769,524 | B2 | * | 8/2004 | Yasui et al. ................ 192/35 |
| 2002/0079179 | A1 | | 6/2002 | Hirota et al. |

FOREIGN PATENT DOCUMENTS

| | | |
|---|---|---|
| EP | 0 326 966 A2 | 8/1989 |
| GB | 1 500 766 A | 2/1978 |
| JP | 2001-33470 A | 2/2001 |
| JP | 2002-266904 A | 9/2002 |
| WO | WO 03/019028 A1 | 3/2003 |

OTHER PUBLICATIONS

European Search Report, EP04009067.*

* cited by examiner

*Primary Examiner*—Saul Rodriguez
(74) *Attorney, Agent, or Firm*—Frishauf, Holtz, Goodman & Chick, P.C.

(57) ABSTRACT

Disclosed is an electromagnetic coupling designed to strengthen the magnetic force exerted from an electromagnetic coil in the direction in which a pilot clutch is operated. In the electromagnetic coupling with the pilot clutch for activating a main clutch wherein clutch plates are thrust with a retaining ring moved by magnetic force produced by an electromagnetic coil in the pilot clutch, the electromagnetic coil in the pilot clutch is surrounded with ferromagnetic material over at least two of its three facial sides other than its magnetic force exerting facial side, namely over at least its rear and outer facial sides and the ferromagnetic material is covered with nonmagnetic material.

6 Claims, 6 Drawing Sheets

F I G. 6
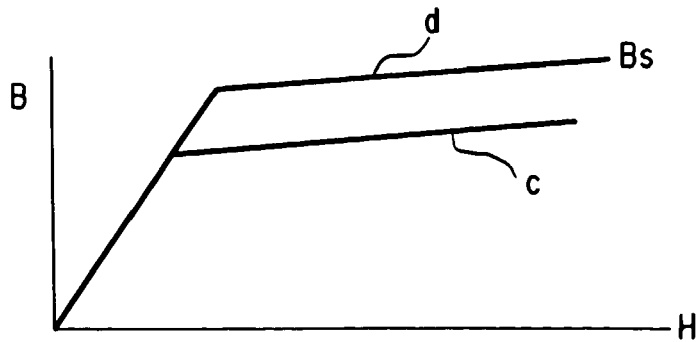
F I G. 7
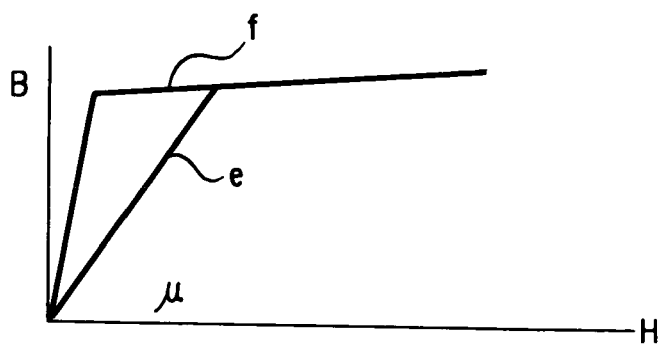
F I G. 8
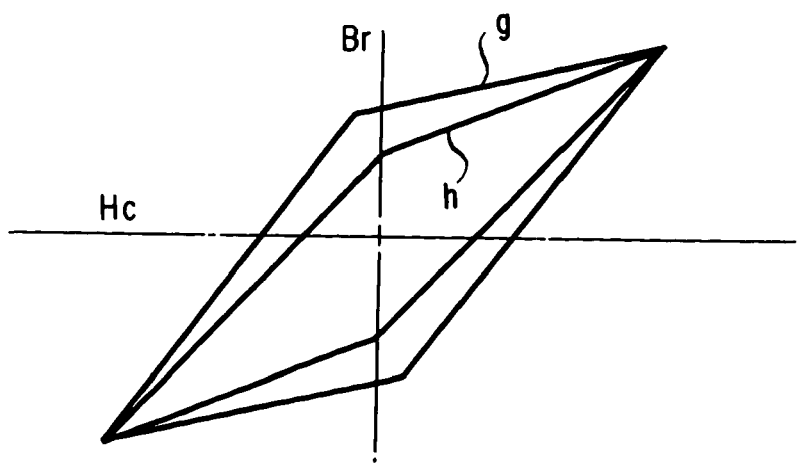

ELECTROMAGNETIC COUPLING

BACKGROUND OF THE INVENTION

1. Field of the Invention

The present invention relates to an electromagnetic coupling for operating a main clutch into ON (connecting) and OFF (disconnecting) states by means of a pilot clutch operated by electromagnetic force.

2. Description of the Prior Art

A conventional electromagnetic coupling of this type is made up, for example, as shown in FIG. 1. Referring to the Figure, the electromagnetic coupling includes an input shaft 1 that is connected to an engine (not shown) side, an output shaft 2 for transmitting power to rear wheels, and a main clutch 3 for connecting and disconnecting the input shaft 1 to and from the output shaft 2. The main clutch 3 comprises inner plates 3a whose inner diameter sides are coupled in spline engagement with the outer periphery of the input shaft 1 and outer plates 3b whose outer diameter sides are coupled in spline engagement with the inner periphery of a casing 2a united to the output shaft 2 in a manner to be described later, the inner and outer plates 3a and 3b being alternately positioned. A fixed plate 4 is fastened to an end of the casing 21 and a thrust means 5 has a push plate 6 such that pushing the inner and outer plates 3a and 3b against the fixed plate 4 with the push plate 6 under a pressure engages the input shaft 1 with the output shaft 2 and removing the pushing pressure or thrust disengages the output shaft 2 from the input shaft 1. See, e. g., JP 2002-266904 A (pages 5 to 6 and FIG. 1).

The thrust means 5 comprises the abovementioned push plate 6, a backing plate 7 disposed behind the push plate 6, and a thrust generating mechanism 8 for actuating the push plate 6 to push with respect to the backing plate 7 via balls disposed between them.

The inner diameter side of the push plate 6 is coupled in spline engagement with the input shaft 1. And, the backing plate 7 with its end face supported by a thrust bearing 16 is supported rotatably relative to a boss section 2b of the output shaft 2 and has its inner diameter side fitted with the outer periphery of the input shaft 1 so that it can be rotated while in sliding contact with the latter. Further, this backing plate 7 is coupled via a pilot clutch 9 lying outwards thereof to the casing 2a united with the output shaft 2 so that it can engage with and disengage from the casing 2a in a direction in which it is rotated.

In the pilot clutch 9, a retaining ring 10 is axially inserted into an annular space formed between the outer periphery of the backing plate 7 and an inner periphery of the casing 2a so that it can be axially moved in sliding contact with these peripheries in that space to an extent that it comes into contact with a stop ring 17. And, between the retaining ring 10 and a rotor section 2a' of the casing 2a there are positioned alternately clutch plates 9a of a first group whose inner diameter sides are coupled in spline engagement with the outer periphery of the backing plate 7 and clutch plates 9b of a second group whose outer diameter sides are coupled in spline engagement with the inner periphery of the casing 2a. And, axially rearwards (at the left hand side as shown) of the rotor section 2a' of the casing 2a there is provided a ring shaped electromagnetic coil 11 for electromagnetically attracting the retaining ring 10 towards the rotor section 2a' of the casing 2a to bring the clutch plates 9a, 9b into pressure contact with one another, thereby turning the pilot clutch 9 into its ON state.

The electromagnetic coil 11 is disposed in a ring shaped chamber 12 formed by a stepped recess formed in the casing 2a and an outer periphery of the boss section 2b of the output shaft 2 and arranged therein so that it is juxtaposed with the pilot clutch 9 across the rotor section 2a'. And, this electromagnetic coil 11 is supported from a cover member 13 which is securely connected to a frame (not shown) and which is fitted over and rotatably coupled to the output shaft 2 via a bearing 18.

Opposed to the electromagnetic coil 11, the rotor section 2a' of the casing 2a and the flange 2b' of the boss section 2b, which are positioned diametrically outwards and inwards, respectively, as separate members, are united together with a ring of nonmagnetic material 14 that is composed of stainless steel as a nonmagnetic material. Also, the clutch plates 9a, 9b of the pilot clutch 9 are provided at respective diametrical positions thereof flush with the inner and outer peripheral surfaces of the ring of nonmagnetic material 14 with cutouts 19 and bridges (not indicated) interconnecting them for preventing a magnetic force on a magnetic loop 15 of the electromagnetic coil 11 from short-circuiting.

The electromagnetic coupling constructed as mentioned above operates as stated below.

Turning current conduction to the electromagnetic coil 11 ON generates the magnetic loop 15 in which the retaining ring 10 is attracted magnetically by the electromagnetic coil 11. This causes the clutch plates 9a and 9b in the pilot clutch 9 to be pushed against the rotor section 2a' of the casing 2a whereby the pilot clutch 9 is turned into its ON state and the backing plate 7 in the thrust means 5 is then brought into engagement with the casing 2a, namely with the output shaft 2. In a 4WD coupling, its 4 WD state is taken by this state.

If in this state a difference in speed of rotation between the input and output shafts 1 and 2 is produced due to a slip of the rear wheels or the like, then a corresponding difference in speed of rotation is produced between the backing plate 7 in engagement with the output shaft 2 and the push plate 6 in engagement with the input shaft 1. Then, the thrust generating mechanism 8 is brought into operation by such a difference in speed of rotation to push the push plate 6 with respect to the backing plate 7, thereby turning the main clutch 3 into its ON state. Thus, the input and output shafts 1 and 2 are interconnected and rotated in one united body.

The abovementioned thrust generating mechanism 8 comprises balls 8a each of which as shown in FIG. 2A is rollably interposed between a pair of opposed reentrant cam surfaces 6a and 7a of the push and backing plates 6 and 7. When a difference in speed of rotation is produced between the push and backing plates 6 and 7, the ball 8a tends to run on the reentrant cam surfaces 6a and 7a as shown in FIG. 2B with the result that the push plate 6 is moved away from the backing plate 7 in the direction of the arrow shown. Consequently, the plates 3a, 3b of the main clutch 3 is moved and pushed to the fixed plate 4.

The pilot clutch in a conventional electromagnetic coupling as mentioned above must have its capacity increased to meet with the need for a greater torque transmission of the main clutch. If a large torque is to be transmitted in the main clutch, an insufficient capacity of the pilot clutch creates troubles such as that the clutch slips. Also, in strengthening the magnetic force, measures have hitherto be taken of devising the configurations and thicknesses of inner and outer diametrical parts of the housing in which the electromagnetic coil is accommodated. As a result, a considerable number of man-hour and its attendant time period have so far been required in manufacturing an electromagnetic coupling.

On the other hand, while increasing the magnitude of electric current to the electromagnetic coil may strengthening the magnetic field it produces to increase the electromagnetic force, the magnetic saturation of a magnetic material imposes a limitation on increasing the electromagnetic force by increasing the current magnitude.

BRIEF SUMMARY OF THE INVENTION

The present inventors in their zealous research to solve the problems mentioned above have ascertained through several simulations that surrounding an electromagnetic coil with a ferromagnetic material increases the force of attraction of the electromagnetic coil to a pilot clutch.

Accordingly, there is provided in accordance with the present invention an electromagnetic coupling with a pilot clutch for activating a main clutch wherein clutch plates are thrust with a retaining ring moved by magnetic force produced by an electromagnetic coil in the pilot clutch, characterized in that the electromagnetic coil in the pilot clutch is surrounded with ferromagnetic material over at least two of its three facial sides other than its magnetic force exerting facial side, namely over at least its rear and outer facial sides and further that the magnetic material is covered with nonmagnetic material.

In the electromagnetic coupling mentioned above, at least one of the retaining ring and the clutch plate in the pilot clutch may be made of ferromagnetic material; and the ferromagnetic material mentioned above is preferably one of materials selected from the class which consists of a spherical graphite cast iron having a chemical composition containing by weight 2.7 to 3.9% of C, 3.3 to 4.8% of Si, 0.3 to 1.2% of Mn, $P \leqq 0.1\%$, $S \leqq 0.1\%$, 0.01 to 0.1% of Mg, 0.01 to 0.1% of at least one of Ce and La and the balance Fe and having a carbon equivalent $(C-E) \geqq 4.3$ and a silicon steel containing by weight 2.8 to 3.3% of Si, not greater than 1.0% of Al, 0.1 to 0.2% of Mn, not greater than 0.002% of C and the balance Fe. Further, the spherical graphite cast iron may have 0.1 to 1.5% by weight of Mo added thereto According to the present invention, the magnetic force exerted from an electromagnetic coil in the direction in which a pilot clutch is operated can be strengthened. Also, the force exerted by the electromagnetic coil to attract the retaining ring and clutch plates can be increased.

BRIEF DESCRIPTION OF THE DRAWINGS

These and other objects, features and advantages of the present invention as well as other manners of its implementation will become more readily apparent, and the invention itself will also be better understood, from the following detailed description when taken with reference to the drawings attached hereto showing certain illustrative forms of implementation of the present invention. In the drawings:

FIGS. 5, 6, 7 and 8 are graphs comparing a preferred and a conventional composition of ferromagnetic material in respect of magnetic characteristic, magnetic saturation, magnetic permeability and magnetic hysteresis, respectively.

DETAILED DESCRIPTION

Figure 1:
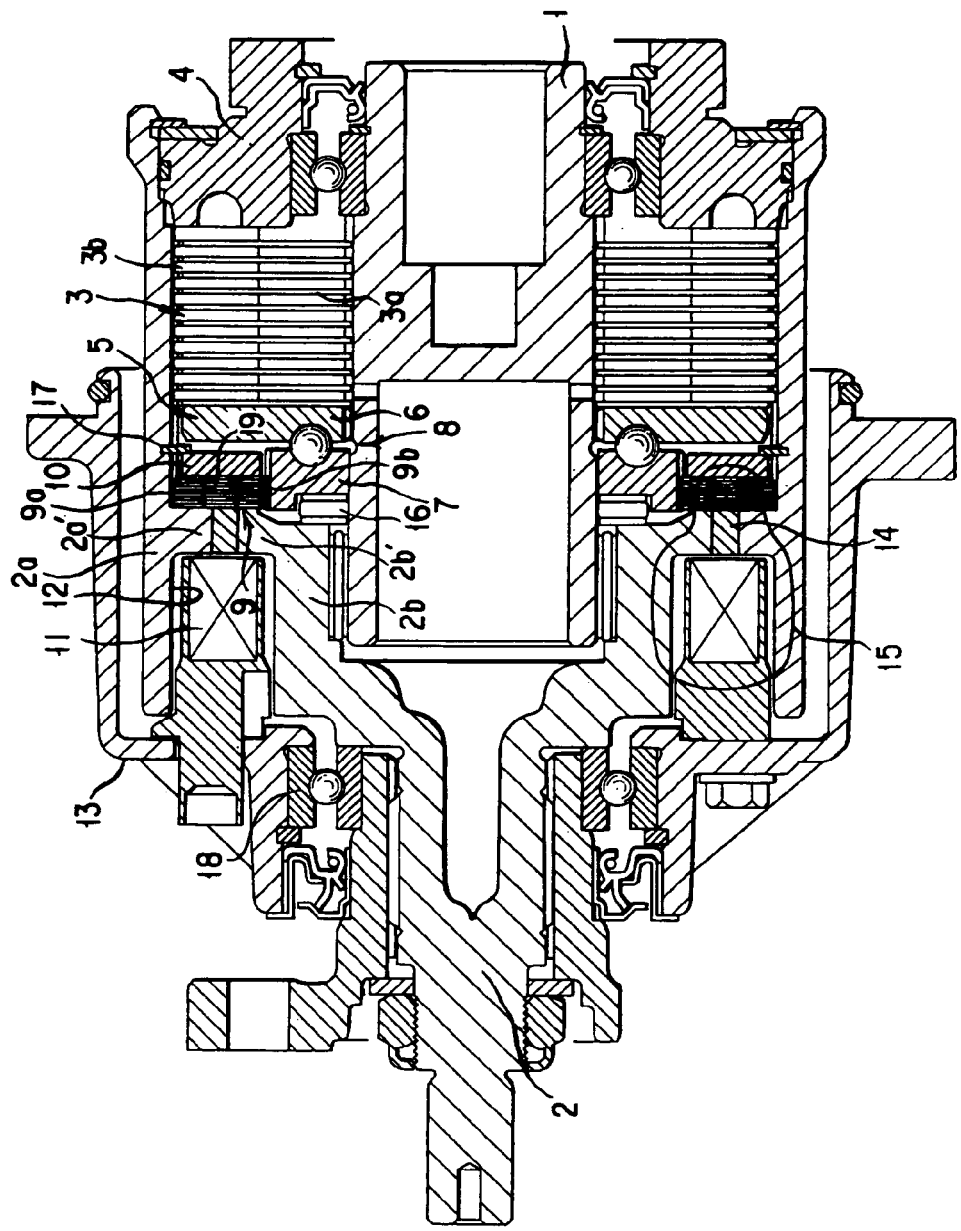
FIG. 1 is a cross sectional view illustrating a typical electromagnetic coupling in the prior art.
Figure 2A:
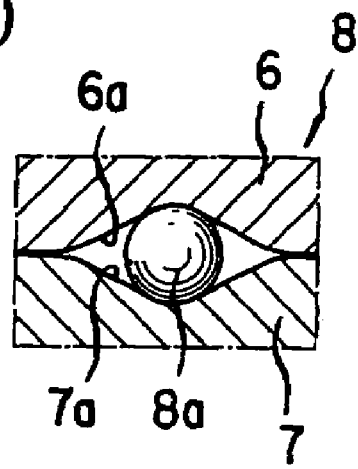
FIGS. 2A and 2B are each a cross sectional view illustrating the operation of a thrust generating mechanism in the conventional electromagnetic coupling shown in FIG. 1.
Figure 2B:
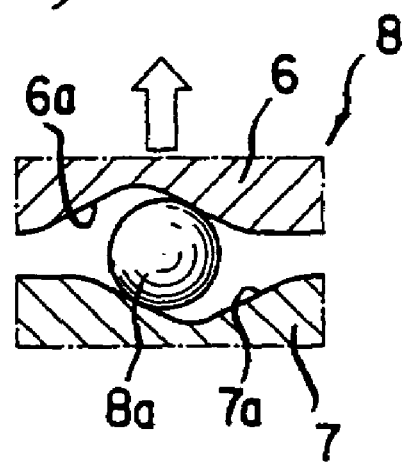

Suitable forms of implementation of the present invention are described below with reference to FIG. 3ff. In the description to follow, it should be noted that the same components as in the prior art shown in and described in connection with FIG. 1 are indicated by the same reference characters and their repeated descriptions are omitted.

Figure 3:
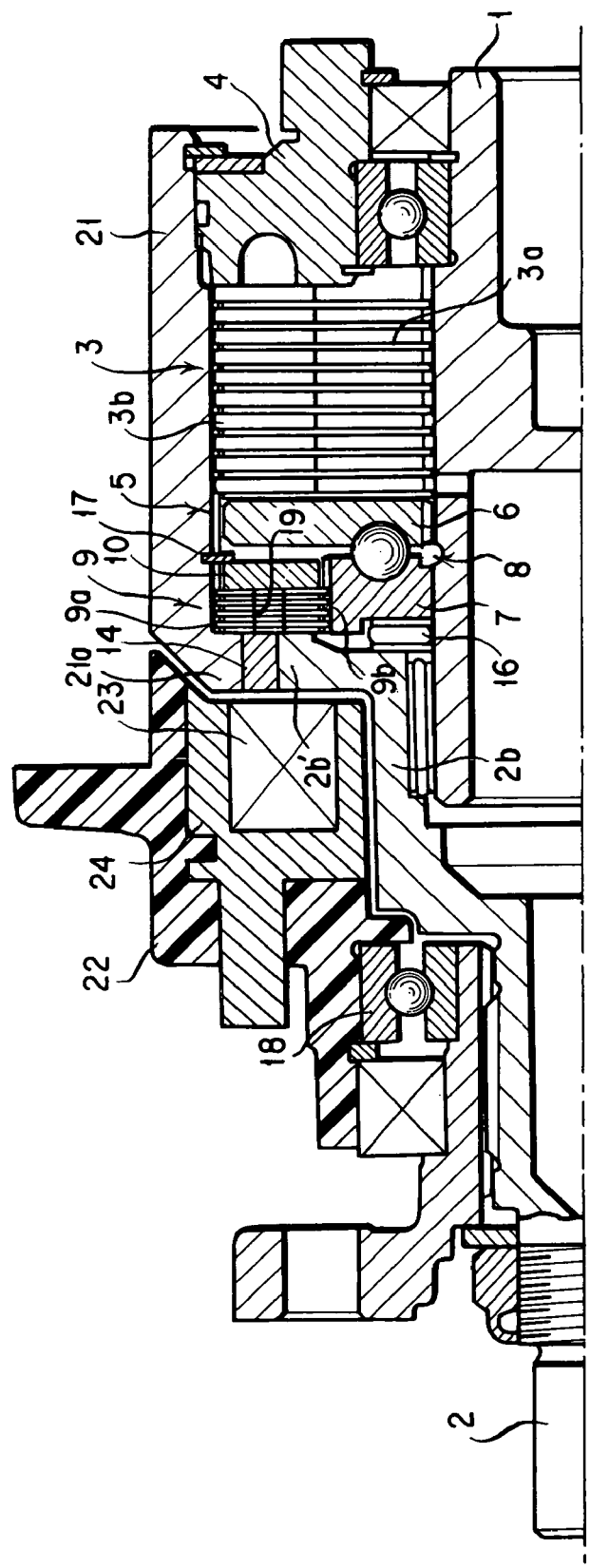
FIG. 3 is a cross sectional view illustrating a form of implementation of the electromagnetic coupling according to the present invention.

Referring to FIG. 3, there is shown a casing 21 in which acting parts for the main and pilot clutches 3 and 9 are accommodated including the retaining ring 10, the casing 21 being united with the output shaft 2. Coupled in spline engagement with inner peripheries of the casing 21 are the outer diametrical ends of the outer plates 3b in the main clutch 3 and the outer diametrical ends of the clutch plates of one group 9a in the pilot clutch 9. And, between the rotor section 21a of the casing 21 and the flange 2b of the boss section 2b of the output shaft 2 there lies, here also, the ring of nonmagnetic material 14, made of stainless steel and fitted to unite them together. Further, the retaining ring 10 and the clutch plates 9a, 9b of the pilot clutch 9 are each composed of a ferromagnetic material, of which use is preferably made of a high-silicon spherical graphite cast iron excelling in electromagnetic properties, by having a chemical composition containing by weight 2.7 to 3.9% of C, 3.3 to 4.8% of Si, 0.3 to 1.2% of Mn, $P \leqq 0.1\%$, $S \leqq 0.1\%$, 0.1 to 1.5% of Mo, 0.01 to 0.1% of Mg, 0.01 to 0.1% of at least one of Ce and La and the balance Fe and having a carbon equivalent $(C-E) \geqq 4.3$ as disclosed in JP 2001-33470 A by the present applicant. The spherical graphite cast iron so composed is also a material that is low in remanence and magnetic hysteresis.

A cover member 22 with which the output shaft 2 is covered and coupled rotatably via the bearing 18 is securely connected to the frame (not shown) and made of a nonmagnetic material such as Al, or synthetic resin which in the form of implementation illustrated is nylon (registered trade mark). Within the cover member 22, an electromagnetic coil 23 is disposed so that its magnetic force exerting facial side (at its front) is opposed to the clutch plates 9a, 9b of the pilot clutch 9 and that other three sides thereof, namely its rear side, and inner and outer peripheral sides, are surrounded with a ferromagnetic material 24 disposed in the cover member 22. And, to be so disposed, the electromagnetic coil 23 and the ferromagnetic material 24 are molded together into the cover member 22 made of resin. Electrical leads connected to the electromagnetic coil 23 are not shown.

The ferromagnetic material 24 with which the electromagnetic coil 23 is to be surrounded may be composed of the high silicon spherical graphite cast iron of which the retaining ring 10 is also preferably composed.

According to this configuration, looped lines of magnetic force generated around the inner and outer peripheries of the magnetic coil by energizing the magnetic coil 23 with electric current are confined within the cover member 22 made of nonmagnetic material while being emanated through the magnetic material from the rear side of the electromagnetic coil along those inner and outer peripheries towards the clutch plates 9a, 9b of the pilot clutch 9.

Then, with the electromagnetic coil 23 surrounded over its three facial sides with the magnetic material 24, the lines of magnetic force from the electromagnetic coil are exerted efficiently. As a result, the electromagnetic coil for emanating lines of magnetic force of a desired strength can be made smaller in size and, in other words, an electromagnetic coil made smaller in size can be manufactured which produces a force of attraction that is sufficiently large.

Figure 4:
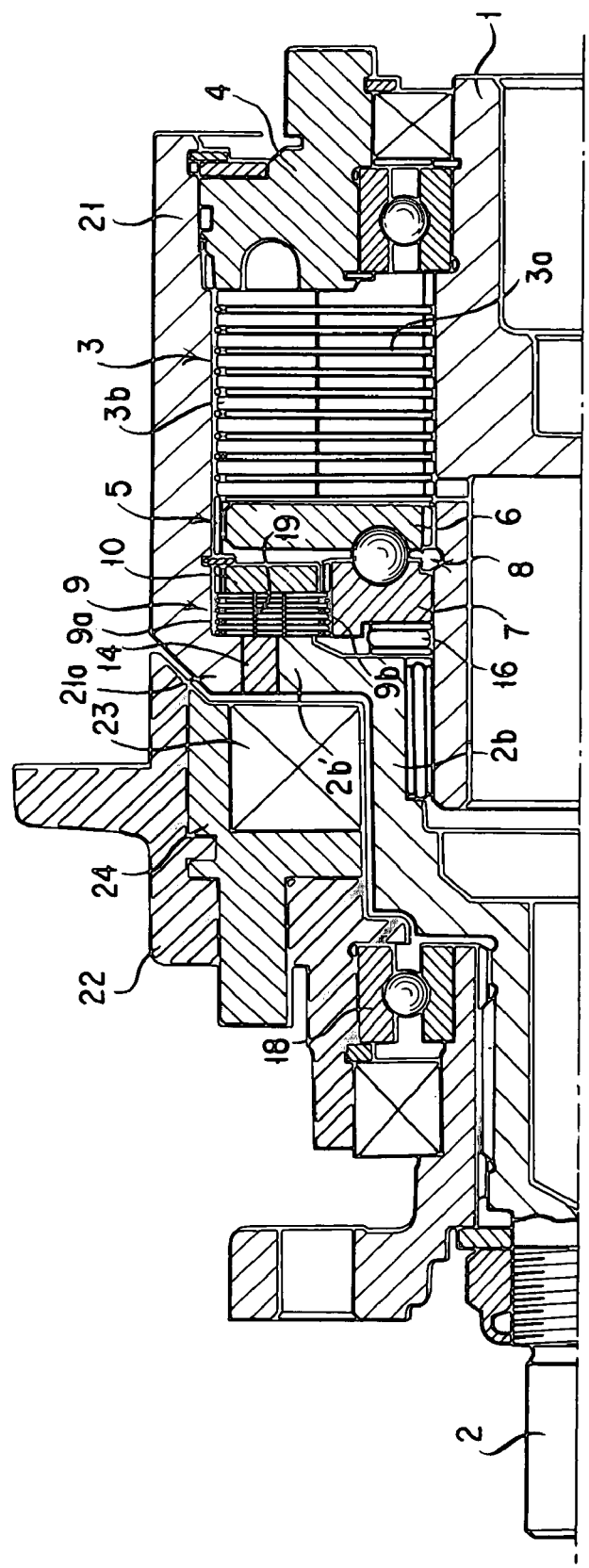
FIG. 4 is a cross sectional view illustrating another form of implementation of the electromagnetic coupling according to the present invention.

While in the form of implementation in FIG. 3 the electromagnetic coil 23 is shown surrounded over three facial sides thereof with the ferromagnetic material 24, it may be surrounded over two facial sides thereof, e.g., its rear and outer peripheral sides, with the ferromagnetic material 24 in another form of implementation shown in FIG. 4 so that its inner peripheral side is opposed to the outer periphery of the output shaft 2 united with the casing 21. The output shaft 2 is here composed of a carbon for machine construction, e.g., S25C.

A high silicon spherical graphite cast iron mentioned above is not only a ferromagnetic material but also a material low in magnetic hysteresis. It is compared with a carbon steel for machine construction as the conventional material so far commonly used, with respect to magnetic property (BH curve), magnetic saturation (Bs), magnetic permeability ($\mu$) and hysteresis as shown in FIGS. 5, 6, 7 and 8, respectively. In this comparison, the carbon steel for machine construction is S25C while the high silicon spherical graphite cast iron has a composition containing by weight 3.33% of C, 4.23% of Si, 0.25% of Mn, 0.021% of P, 0.008% of S, 0.036% of Mg, 0.011% of Ce and the balance Fe.

Figure 5:
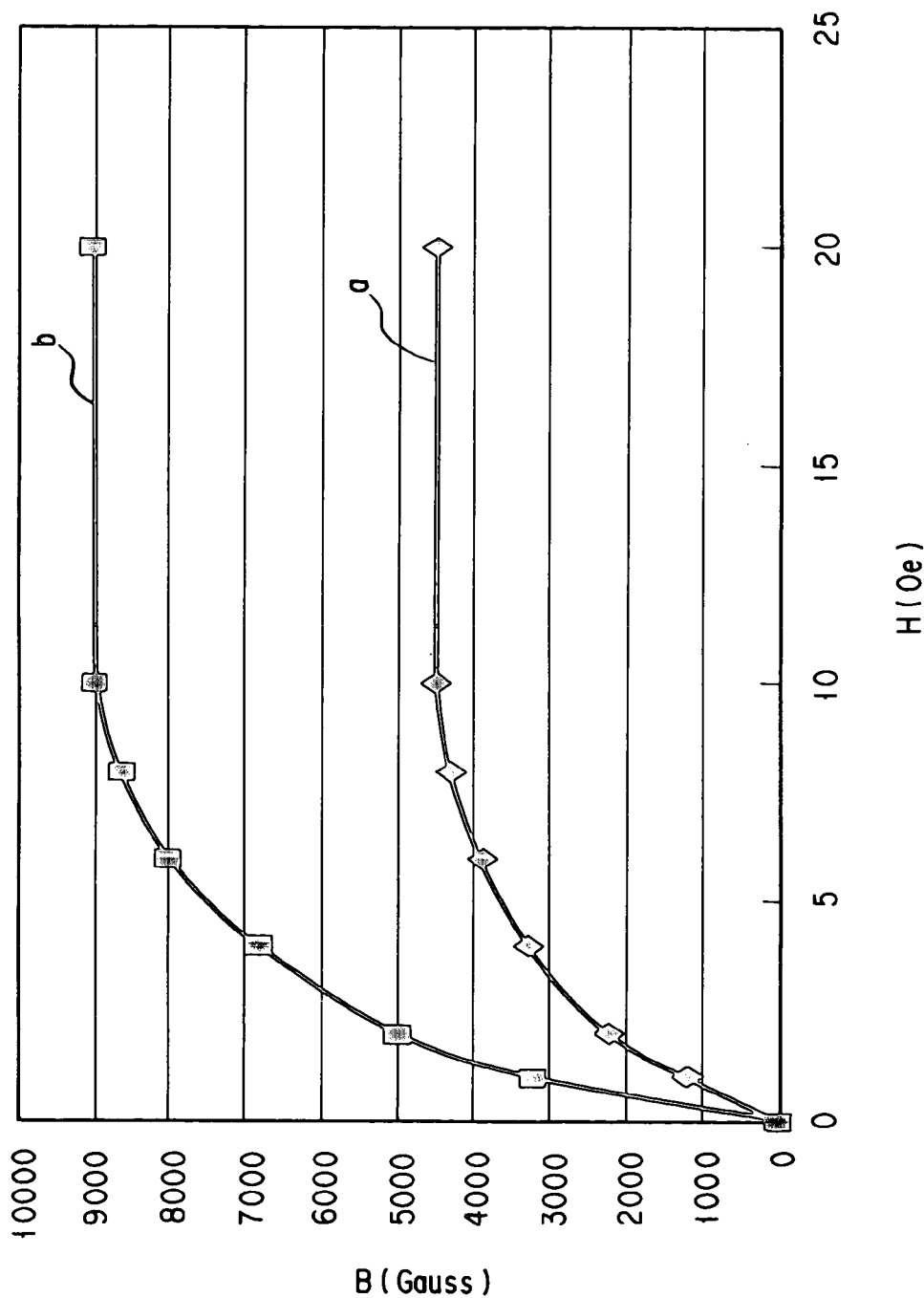

In FIG. 5 which shows the magnetic property taken for magnetic flux density (B) with respect to magnetic field (H), curve a represents the BH curve of the conventional material and curve b represents that of high silicon spherical graphite cast iron, from which it is seen that the latter is superior to the former in the BH property.

In FIG. 6 which shows magnetic saturation (B), curve c represents that of the conventional material and curve d represents that of high silicon spherical graphite cast iron, from which it is seen that the latter is greater than the former in magnetization.

In FIG. 7 which shows magnetic permeability ($\mu$), curve e represents that of the conventional material and curve f represents that of high silicon spherical graphite cast iron, from which it is seen that the latter produces greater magnetization than the former with a small current when the coil current is relatively small.

In FIG. 8 which shows magnetic hysteresis, curve g represents that of the conventional material and curve h represents that of high silicon spherical graphite cast iron, from which it is seen that the latter is smaller than the former in both coercive force (Hc) and residual flux density (Br).

The retaining ring 10 and the clutch plates 9a, 9b of the pilot clutch 9 and the ferromagnetic material 24 may alternative to high silicon spherical graphite cast iron be composed of a silicon steel. The silicon steel should preferably has a chemical composition containing by weight 2.8 to 3.3% of Si, not greater than 1.0% of Al, 0.1 to 0.2% of Mn, not greater than 0.002% of C and the balance Fe. Such silicon steel has an elongation of 20% and can well withstand a press forging. This material is not as good as the high silicon spherical graphite cast iron with respect to electromagnetic characteristics, but is high in productivity and inexpensive.

The addition of Mo is not indispensable as far as a part or component of the high silicon spherical graphite cast iron composition is allowed to work at the room temperature and its electromagnetic characteristics are also unaffected by no addition of Mo. In an environment, however, where its temperature rises to 300° C. or more, the part or component may be embrittled and broken. In order to preclude this possibility, the addition of Mo in an amount of 0.1 to 1.5% by weight has been found effective. Thus, the tendency of high silicon spherical graphite cast iron to embrittle can be eliminated by adding thereto Mo in an amount of, say, 1.0% by weight. Also, while in the form of implementation illustrated above both the retaining ring 9 and the clutch plates 9a, 9b are shown to be composed of ferromagnetic material, one of them may be composed of a carbon steel for machine construction such as S25C.

Although the present invention has hereinbefore been set forth with respect to certain illustrative embodiments thereof, it will readily be appreciated to be obvious to those skilled in the art that many alterations thereof, omissions therefrom and additions thereto can be made without departing from the essences and scope of the present invention. Accordingly, it should be understood that the invention is not intended to be limited to the specific embodiments thereof set forth above, but to include all possible embodiments that can be made within the scope with respect to the features specifically set forth in the appended claims and to encompass all the equivalents thereof.

The invention claimed is:

1. An electromagnetic coupling with a pilot clutch for activating a main clutch wherein clutch plates are thrust with a retaining ring moved by magnetic force produced by an electromagnetic coil in the pilot clutch, wherein:

the electromagnetic coil in the pilot clutch is surrounded with stationary ferromagnetic material over its rear, inner peripheral and outer peripheral sides, namely over its sides other than its magnetic force exerting side which is its front side, and further the ferromagnetic material is covered over its rear and outer peripheral sides with stationary nonmagnetic material made separately from the ferromagnetic material.

2. An electromagnetic coupling as set forth in claim 1, wherein at least one of said retaining ring and said clutch plate in the pilot clutch is made of ferromagnetic material.

3. An electromagnetic coupling as set forth in claim 1, wherein the ferromagnetic material is one of materials selected from the class which consists of a spherical graphite cast iron having a chemical composition containing by weight 2.7 to 3.9% of C, 3.3 to 4.8% of Si, 0.3 to 1.2% of Mn, P$\leq$0.1%, S$\leq$0.1%, 0.01 to 0.1% of Mg, 0.01 to 0.1% of at least one of Ce and La and the balance Fe and having a carbon equivalent (C-E)$\geq$4.3 and a silicon steel containing by weight 2.8 to 3.3% of Si, not greater than 1.0% of Al, 0.1 to 0.2% of Mn, not greater than 0.002% of C and the balance Fe.

4. An electromagnetic coupling as set forth in claim 2, wherein the ferromagnetic material is one of materials selected from the class which consists of a spherical graphite cast iron having a chemical composition containing by weight 2.7 to 3.9% of C, 3.3 to 4.8% of Si, 0.3 to 1.2% of Mn, P$\leq$0.1%, S$\leq$0.1%, 0.01 to 0.1% of Mg, 0.01 to 0.1% of at least one of Ce and La and the balance Fe and having a carbon equivalent (C-E)$\geq$4.3 and a silicon steel containing by weight 2.8 to 3.3% of Si, not greater than 1.0% of Al, 0.1 to 0.2% of Mn, not greater than 0.002% of C and the balance Fe.

5. An electromagnetic coupling as set forth in claim 3, wherein said ferromagnetic material is said spherical graphite cast iron and said spherical graphite cast iron has 0.1 to 1.5% by weight of Mo added thereto.

6. An electromagnetic coupling as set forth in claim 4, wherein said ferromagnetic material is said spherical graphite cast iron and said spherical graphite cast iron has 0.1 to 1.5% by weight of Mo added thereto.

* * * * *